Figure 1:
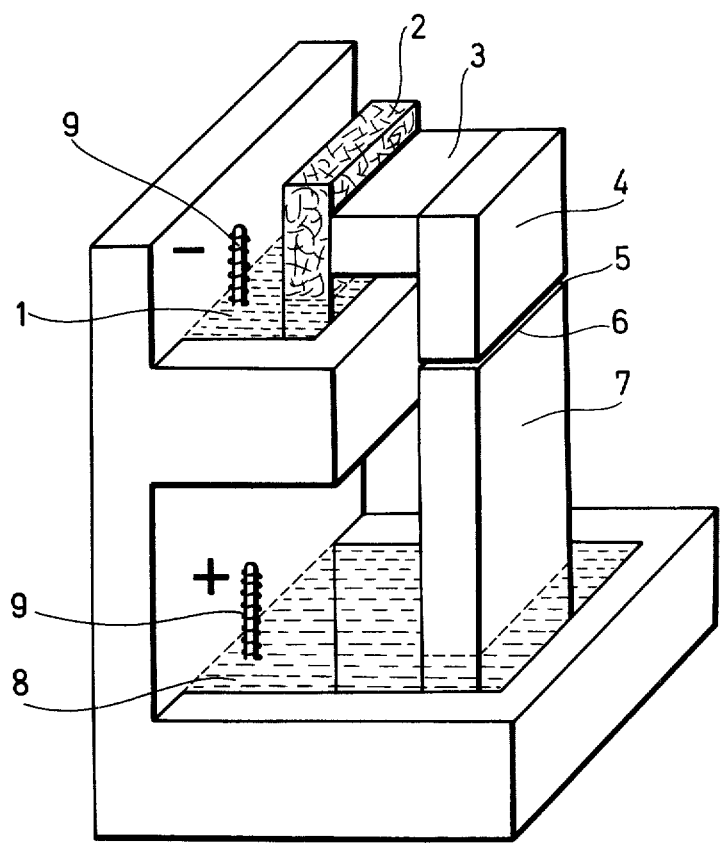

United States Patent [19]

Vadasz et al.

[11] 3,901,782
[45] Aug. 26, 1975

[54] PROCESS FOR THE FRACTIONATION AND IDENTIFICATION OF PROTEINS BY STARCH GEL ELECTROPHORESIS

[75] Inventors: Gyorgy Vadasz; Mihaly Parkany, both of Budapest, Hungary

[73] Assignee: Novex Co. Ltd., Budapest, Hungary

[22] Filed: Mar. 27, 1974

[21] Appl. No.: 455,232

[30] Foreign Application Priority Data
Apr. 5, 1973 Austria .............................. 2991/73

[52] U.S. Cl. .......................................... 204/180 G
[51] Int. Cl. ............................................. B01k 5/00
[58] Field of Search ...................... 204/180 G, 299

[56] References Cited
UNITED STATES PATENTS
3,346,479  10/1967  Natelson ..................... 204/180 G X
3,384,564  5/1968   Ornstein et al. .............. 204/180 G
3,616,387  10/1971  Siebert et al. ................ 204/180 G

*Primary Examiner*—John H. Mack
*Assistant Examiner*—A. C. Prescott
*Attorney, Agent, or Firm*—Gabriel P. Katona

[57] ABSTRACT

Protein fractionation by starch gel electrophoresis involving pressure cooking, moulding and cutting the gel; freezing, thawing and homogenizing the sample; fitting a carrier, such as filter paper, containing the sample between pieces of the gel and impressing a D.C. potential through the gel to cause the electrophoretic fractionation.

5 Claims, 4 Drawing Figures

PROCESS FOR THE FRACTIONATION AND IDENTIFICATION OF PROTEINS BY STARCH GEL ELECTROPHORESIS

The object of the present invention is a process for the fractionation and identification of proteins by starch gel electrophoresis, and an equipment for the realization of said process.

Therapeutics are greatly facilitated and promoted by clinical routine examinations. Serial examinations are similarly often needed in scientific research. In such examinations, besides other requirements, the technical simplicity and high-speed performance of the implementation are of utmost importance. Frequently a process quite suitable for the solution of the problem encountered is known but, because of its awkward technical execution, it cannot be adopted for routine work, and must be replaced by another method supplying much less information but very much applicable for routine test purposes. All these apply to the starch gel electrophoresis.

Several methods are known as suitable for the separation of protein mixtures. For analytical purposes the carrier type electrophoresis is usually employed. The simplest technical implementation is feasible, however, with the paper electrophoresis and therefore, although it does not provide for a satisfactory separation, it is increasingly used for routine test purposes.

In enzyme examinations, as pointed out by Hunter and Witt, the isoenzyme composition must always be known. In such cases, after the electrophoresis has been completed, and if a suitable reaction is feasible, the carrier and the separated enzyme fractions are immersed in such a solution where the reaction of the enzyme under test will produce a visually appreciable insoluble final product. Here an eventual diffusion of the enzyme, if in a carrier not correctly selected, will impair separation, while if in a solution, then the demonstration of the less soluble fractions or of those present in smaller quantities will become uncertain or even impossible.

The most important parameters of separation are the starch concentration, the pH of the buffer solution, and the quality as well as concentration of the ions in the latter. To achieve a given aim, these parameters must be determined by serial examinations which, if a process unsuitable for the purpose is employed, will be rather awkward and lengthy. In most cases, therefore, a compromise is accepted all over the world: either a few compositions supplying acceptable results in general are used or, on the basis of a few preliminary experiments, the adaptable but far from being optimum parameters are worked with. It is clearly seen that the elaboration of a process suitable for serial examinations would require not only the feasibility of the tests, but also the determination of the optimum separation conditions.

For the determination of the isoenzyme spectrum the gel electrophoresis proved to be most suitable among all the known methods. Apart from some technical difficulties, the "Starch Gel Electrophoresis" (SGE) appears to be the very best method (Devenyi and Gergely: Amino acids, peptides, proteins, Budapest 1963, p. 36; Backhaus: Immune diffusion and immune electrophoresis methods, Budapest 1968, p. 13), as attested by the increasing number of papers, containing valuable results, after the fundamental publication of Smithies (Nature 175,3o7, 1955; Biochem. J. 71,585, 1959), such as Moretti et al.: Bull. Soc. Chim. Biol., 39,593, 1957 and 40, 59, 1958; Vesselinovitch: Nature, 182, 665, 1958; Cunningham, Magnusson and Johus, :J. Chromotog. 5, 90, 91 1961; Mauray et al.: Bull Soc. Chim. Biol., 43, 993, 1961; Bocci: Nature, 197, 491, 1963 and J. chromatog. 11, 515, 1964; Deanis: J. Chromotog. 10, 450, 1963. An advantage of SGE is its combining electrophoretic separation with that by the molecule size. A number of papers deal with the improvement of the SGE technique, whereby increasingly precise results and ever more sensitive separations are possible (Gordon, A.H.: Electrophoresis of proteins in polyacrylamide and starch gels, North-Holland 1969).

The advantage of starch gel electrophoresis as against that with acrylamide gel is the simple and inexpensive production since, in addition to starch, nothing but a buffer solution and a protein dyestuff are needed, and also its not being toxic. Medical research has elaborated the diagnosis of several diseases (cardiac maladies, tumours, etc.) by means of SGE.

Smithies found that a complete solution of the starch would require a sufficiently high temperature and a period of several 10 minutes. A homogeneous starch gel structure can only be ensured by using a homogeneous initial solution. Gel preparation according to literature is over an open flame, in a vibrated flask, in which case the required heating time cannot be provided for. Part of the colloid solution will often not be heated sufficiently, whereas along the walls local overheating or even burn-on may occur which will greatly impair the gel quality. In the course of boiling and vacuum debubbling, due to the uncontrollable evaporation of the water, the composition will similarly change to an uncontrollable extent, changing again during the next preparation, which makes the comparison of the successive tests rather uncertain.

Gel casting was performed so far with a rusher as the mould. Although in a precisely levelled equipment a uniform layer thickness can be readily achieved, over the surface contacting the atmosphere a considerable composition change will take place, owing to evaporation, in the gel. This defect can be more or less avoided, but only in a very complicated manner.

In gels prepared with the hitherto methods the elimination of defects due to inhomogeneity was attempted by using an extended running distance whereby, partly because of the increased absolute dimensions, and partly as a result of certain unavoidable defects, the inaccuracy or distortion due to the inhomogeneity referred to above was much smaller. The construction suitable for refined separation permits a 50 mm separation distance, but each of the three gel block dimensions must be maintained at a constant value.

So far, if either the rusher or, as in certain cases, a mould prepared specially for this purpose was used for gel casting, the gel structure developed along the edges was entirely different as compared to that in the middle, due mainly to the different cooling conditions. Thus only part of the gel cross section could be made use of, without any samples over the edges.

According to the present state of art two basic methods are known for sample feeding. Either in the course of casting, or afterwards by means of a suitable tool a "container" of sufficient size is cut in the gel, where the sample is then fed after it had been made consistent with starch admixture or some other additive. With the other method an opening is cut in the gel by a scalpel, and the sample-impregnated filter paper is then placed into this slit. Both methods have the following disadvantages:

a. Along the edges of the gel block a certain distance must be left free because of the gel defect described above, and many other areas will also be left vacant between the samples.

b. Separation along the sample edges will be defective, thus a rather wide feeding is needed to provide for a part sufficient for evaluation.

c. In the case of a simple paper strip feeding the hazard of a transversal crack will exist which would make all labour input to have been in vain. In addition, overdilute solutions require preconcentration as the use of several filter paper layers might increase the danger of cracks.

Considering the starch, buffer solutions and protein dyestuff chemicals used for SGE as basic materials, and the reagents employed for enzyme reactions as auxiliary substances, it may be stated that these basic materials are inexpensive, which is one of the advantages of the starch gel electrophoresis. With these inexpensive materials, however, the individual enzymes certainly cannot be identified. Thus the situation has completely changed when the application of the methods of histochemical enzyme staining was commenced, since SGE proved to be excellently suitable for the determination of the isoenzyme composition of a continuously increasing importance in clinical diagnostics and many other fields. The electrophoretic techniques, therefore, although they essentially separate proteins, actually hardly work only with a simple protein staining method anymore, but emphasize the demonstration of enzyme active components. The implementation of such reactions, however, requires expensive compounds often difficult to acquire or produce in the laboratory. This is why a dimensional reduction of the gel sheet to be tested has become so much important, just like to avoid the vacant areas containing no samples. The information supplied by the electrophoresis, on the other hand, will increase both in amount and value, if several determinations are simultaneously performed with the same test material.

After the electrophoresis the gel is cut in two or more slices, in the plane parallel to its face. This is partly to avoid defective surfaces, and partly to lead the diffusion of the reagents along a distance of max. 2-3 mm. On the other hand, no thick gel blocks resulting in several parallel samples may be used because of the Joule heat produced during the electrophoresis since here an increased core temperature at the middle of the plate must always be reckoned with, even under the most intensive cooling conditions. In such cases, in addition to thermal inactivation which makes enzyme demonstration impossible or at least rather uncertain, the running rate will also vary which, in turn, aggravates the comparison of the plates. Besides the shortcomings of the hitherto procedures as mentioned above, no such running will result in more than 2 or 3 parallel samples.

The relatively large and fragile sheets are placed into a glass container, which is another rather awkward operation, then, by filling up the vat with sometimes too much incubating solution, the reaction is performed. The exchange of the solutions is similarly a rather difficult task, often leading to sheet damages. Even a minor damage may make the preparate unsuitable for documentation purposes, whereas a serious damage can make the evaluation, too, impossible or difficult. Thus the disadvantages of the method are the high reagent requirement, awkward handling, and damage hazards.

So in spite of its suitability, the method has never been generally accepted for routine examinations because of the difficulties of its technical solution. The necessary equipment is large in dimensions, and the gel types produced with different cooking methods for the individual experiments proved to be similarly different, that is, reproducibility was not satisfactory, either.

Histological and histochemical examinations performed by means of the methods known so far required 1 or 2 g of tissues. To remove such a relatively high sample quantity from the living human organism for diagnostic purposes is generally impossible. The tissue sample quantity available is usually 10 to 20 mg. whose homogenization and, in the meantime, the maintenance of enzyme activity have not been solved as yet. Thus the iso-enzyme composition, providing for important diagnostic information, could not be determined in the majority of the cases.

The electrophoresis devices known at present have similarly a number of disadvantages. The gel must be produced in the electrophoresis cell, or else its treatment would be overcomplicated. The cell, therefore, cannot be used for electrophoresis during the gel preparation and solidifaction period. The precision of gel thickness depends, among others, on the accuracy of the apparatus levelling. In the devices known the filled-in gel is blanked after consolidation which often leads to a rupture, but this can be discovered only after the completion of the electrophoresis, so the entire test must be repeated. The filter paper-current lock type electric contact is uncertain. A high voltage and, in the fcase of thick samples, sufficient internal cooling must be provided for, thus shock hazards will exist.

Because of the disadvantages enumerated above, electrophoresis used to be a sophisticated operation of high labour requirement and, therefore, not suitable at all for mass examinations like medical screening. And this is why the devices known are not suitable, either, for routine test purposes.

The present invention is aimed at making SGE suitable for the completion of enzyme-histochemical examinations by the determination of the iso-enzyme spectrum of the enzymes detected. A method has been elaborated to make possible the performance of a number of serial measurements with the simplicity, speed, and reproducibility required from routine tests. Another objective was to perform the tests in micro-dimensions, including the sample quantity to be used, just like the quantity of the solution used for incubation, which is often expensive and difficult to acquire.

It was recognized that starch cooking would be better performed at a pressure (1.0–1.3 atm), and that the air should be removed from the preparate by blow-down to the atmospheric pressure. Thus the high degree of uncertainty and the accident hazard in the case of vaucuum type air removal could be eliminated. While the autoclave is cooling, there will be a temperature and pressure gradient, respectively, produced therein, making air removal from the starch absolutely perfect. Cooking at a higher temperature but for a shorter period of time results in a much more homogeneous gel better to reproduce.

It was recognized, furthermore, that the simplest solution would be to cast an incubation vessel made of wax, paraffin, or any other similar material, in which only 1 or 2 cm³ incubator solution must be used. The paraffin container need not be cleaned after each use, but can be used repeatedly by refill. Embedment in wax or paraffin was found to be suitable for the storage of the samples as well, if the glycerine treated slices were placed on object slides, which would then be circumcast with wax or paraffin. Preparates thus preserved can be photographed, and stored infinitely.

It was recognized, finally, that homogenization of the 10 to 20mg. tissue sample could be best performed in a vial, after repeated freezing and thawing in a suitable mortar, by placing onto the sample in the vessel a beater matching to the internal surface of the vessel, e.g. to its spherical segment shaped lower part, such as a glass mallet of a pear-shape end, whereafter the mortar with the sample and the beater is placed into a vibrator.

Thus the invention is based on a total transformation for the SGE methodology, in the course of which a starch gel of homogeneous structure is produced, in a manner easy to reproduce identically, with a uniform gel thickness and surface. The accuracy of each dimension of the gel sheet is achieved by using a cutter device.

A new runner vessel type has been elaborated, where sample feeding is performed by feeding a sample in the gel of e.g. 20 mm width wherefrom, if sliced parallel to the 7 mm. side, a total of 10 slices suitable for the determination of the different components can be obtained. If 4 samples are fed in simultaneously, then, by slicing parallel to the 20 mm. side, 3 or 4 slices are obtained, thus only 3 or 4 different components can be determined, although from 4 different samples.

Essentially, therefore, the method according to the present invention consists of cooking the starch in a pressure vessel at a pressure of 1.0–1.3 atm., whereafter the air is removed from the starch by pressure compensation, then the vessel under presure is closed again, whereby cooling off will produce depression which, in turn, leads to complete air expulsion. The boundary surface layer(s) of the gel block thus cast is (are) cut off, then the block cut in two, between which a carrier containing the sample e.g. filter paper, porous glass, or a ceramic is fitted tightly. Finally, an incubator of a few cm³ volume is cast by using a material melting at a temperature more than 30°C, such as paraffin, the electrophoretized gel block is cut to slices of a few mm thickness, and these slices are then placed in an incubator solution contained by the incubator.

Essentially, the electrophoresis equipment according to the present invention consists of a gel block represented by a prism of constant cross section in which, between the cutting surfaces of the cut parallel to the running direction, a body containing the sample to be tested is tightly located, preferably filter paper, porous glass, or a ceramic.

Essentially again, the equipment for tissue homogenization consists, according to the present invention, of a spring-suppported armature located above an electromagnet. Since the spring constants are different, the armature will, upon the vibration effect of the electromagnet switched to the AC circuit, perform not only a vertical movement but also lateral tilting. The homogenizer vessels, preferably vials, located in the rack mounted to the armature, and the beaters therein, preferably glass rods of a pear shaped end, perform vertical plus rotating movements.

Now two examples of the realization of the method corresponding to the present invention, and an equipment conforming thereto, will be described as related to operation.

Figure 3:
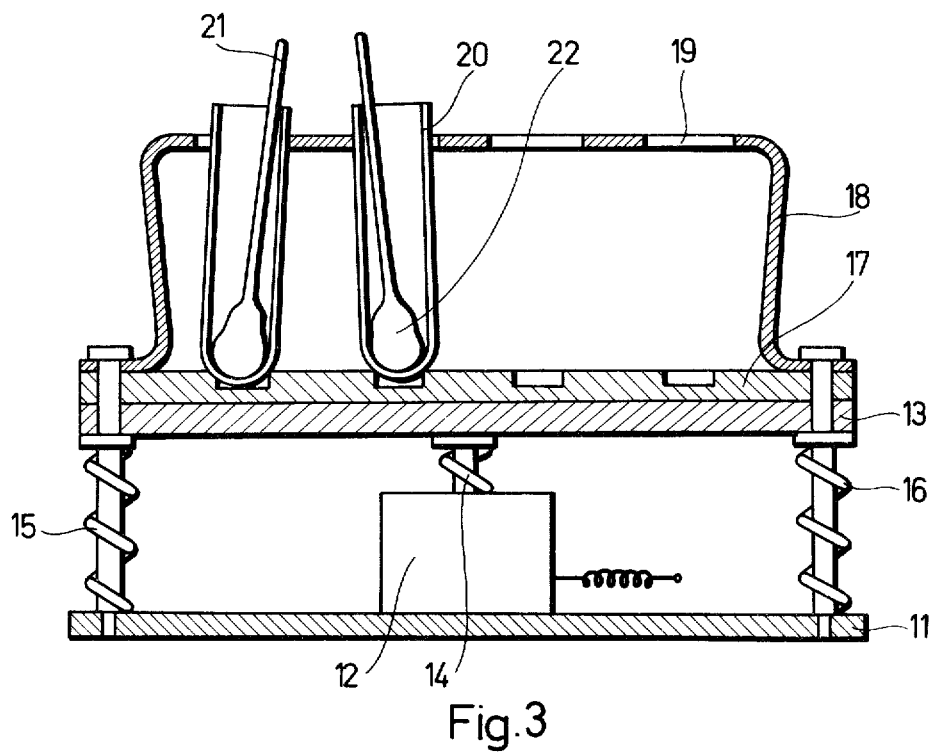
Figure 2:
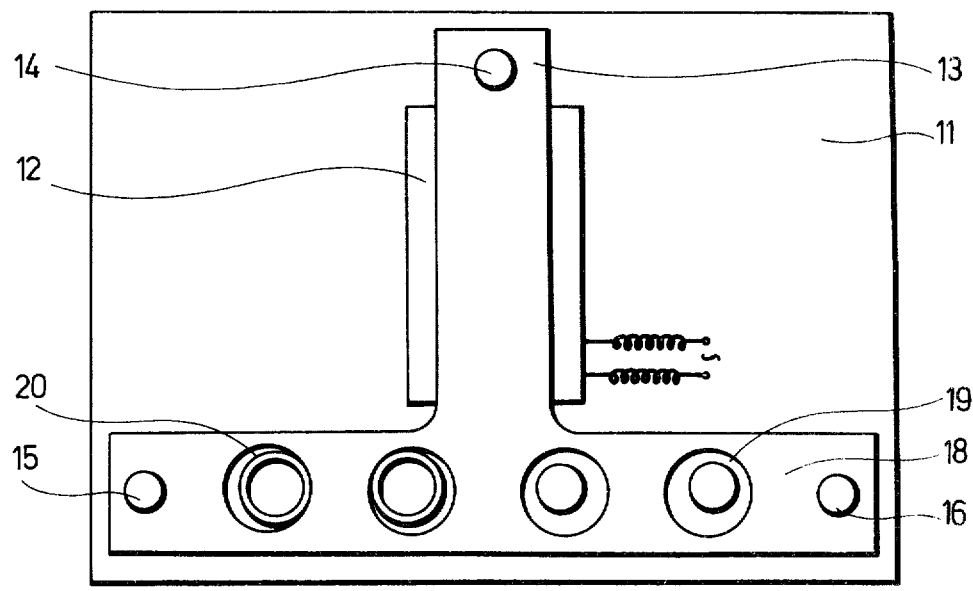

FIG. 1 illustrates a unit of the electrophoresis apparatus according to the present invention, FIG. 2 the top view of the homogenizer, and FIG. 3 an elevation thereof.

EXAMPLE 1

An exemplary realization of the method corresponding to the present invention, and an example of the electrophoresis apparatus according thereto (FIG. 1), are presented for the determination of the iso-enzyme of a nonspecific esterase.

The buffer solution in the top container 1 is absorbed by the viscosa sponge 2, whereby the latter will become suitable for electric current conduction. Sponge 2 is in contact with gel block 3, and that with gel block 4. The precise contact of surfaces 5 cut perfectly in plane lead to a good current transmission. The filter paper or porous glass 6 consisting of one or more layers and containing the sample to be tested is fitted tightly to the lower cutting surface 5 of the gel block 4, whereto, from underneath, gel block 7 is attached in which the protein fractionation takes place upon the DC effect. Gel block 7 is dipped in the lower buffer container 8 to a depth of 10 mm., whereby the circuit between the leads 9 connected to the + and − poles is closed. Amplification of the gel blocks and the sponge has not been illustrated in the drawing.

Gel cooking makes use of hydrolized potato starch. The basic buffer solution consists of 184 g. tris and 21 g. citric acid solved in distilled water up to 2000 ml. This solution is then diluted to its tenfold before use.

Now 10 g. of starch is fed into a 200 ml. flask, and cold suspended with 15 ml. of dilute buffer. In another flask 50 ml. dilute buffer is heated up to boiling, then added to the cold suspension through admixture. Further 20 to 30 sec. agitation supplies a partly gelated dense mass still not settling. The mouth of the flask is closed with aluminum foil, and the flask is then placed into an autoclave heated previously to boiling. Heating is continued for 40 min. from the beginning of boiling, then stopped. The contents of the flask will cool off somewhat slower than the water surrounding the flask in the autoclave, so these contents will behave like a slightly overheated liquid, that is, keep on boiling during the cool-off period until the pressure has not decreased to that of the atmosphere. This process ensures perfect debubbling without changing the gel composition due to evaporation. Debubbling this way is much better than that by vacuum.

The gel produced by means of the method described above is homogeneous and can be readily reproduced. For comparison it is most important to have a homogeneous gel block of uniform cross section and identical dimensions during the successive experiments.

According to experience, a running length of 60 to 70 mm, a thickness of 6 to 10 mm., and a width of 20 mm. are the most favourable dimensions for gel block 7.

The gel blocks are produced by mould casting, then the removed gel block 7, cut to size, is placed in a cuvette. Now sample 6, absorbed by a filter paper or porous glass similarly cut to size, is placed on the surface 5 of gel block 7, and pressed to position by gel block 4 of a height of about 20 mm, naturally also cut to size.

After electrophoresis, gel block 7 is sliced to 1–2 mm. thick sheets on which the desired well-known reactions are performed by means of incubator solutions. Slicing is by a special device, with a cutting edge made of a razor blade or stretched thin wires.

Now the slices of about 70 mm. length, 7 mm. width, and 1–2 mm. thickness are placed in the incubator. In order to minimize the incubator solution to be used, the gel block parts containing no samples are removed, while the samples are placed into the paraffin incubator designed specially for this purpose. The form of the incubator is accommodated to the shape of the sample slices.

EXAMPLE 2

When testing a tissue sample, the histological specimen of ultra-micro dimensions is homogenized in the apparatus corresponding to FIGS. 2 and 3. The AC electromagnet 12 is placed onto the base plate 11 of the equipment, with the T-shape mild iron armature 13 above, supported by springs 14, 15 and 16, whereof the constants of the latter two differ.

The part of the armature 13 corresponding to the horizontal shaft of the T supports the rubber sheet 17 and the stand 18. The latter has perforations 19 in which the vial tubes 20 of an internal surface roughened to mat and acting as mortars are loosely fitted. Each tube 20 has a glass rod 21 acting as beater therein, with its frosted and of a more or less calotte surface fitted to the internal bottom surface of the tube.

The advantages of the method and equipment corresponding to the present invention may be summarized as follows:

Production of the starch gel according to the present invention results in a homogeneous gel easy to reproduce, with the accident hazard due to air removal completely eliminated. Producing the gel in a mould, independently of the cell does not occupy the cell on one hand, whereby the cell can be much better utilized, while, on the other hand, the gel dimensions will be much more accurate, and the surfaces uniform as well as parallel because of the slicing and, finally, no special cooling is needed since application is in a much thinner layer.

The incubator made of paraffin requires a much lesser solution quantity for incubation.

Location and embedment of the sample in the gel is a simple and precise operation: according to our practical experience no defect is feasible. The lower end of the gel is in the buffer solution while its top part is attached to a viscous sponge, whereby the current supply ensures a good contact. The operation can be performed under a voltage of 220 V. The construction according to the present invention results in small structural dimensions, thus, because of the reduced cooling output demand and small size, the operation may be implemented in a refrigerator. In addition, the construction corresponding to the present invention permits the testing of 8 different samples simultaneously in the same equipment, and the identification of 3 or 4 different components per sample, or, if only two samples are being tested, the identification of even as much as, say, 10 different components.

For histological investigations a very small quantity of tissue is entirely sufficient, and a homogeneous sample can be produced in a relatively short period of time.

The method according to the present invention is made excellently suitable for routine examinations and screening tests involving a considerable part of the population by the simplicity, high speed, good reproducibility and, last but not least, the possibility to parallelly perform a number of analyses.

What we claim is:

1. Method for protein fractionation by starch gel electrophoresis, characterized by cooking the starch in a pressure vessel at a pressure of 1.0 to 1.3 atm, removing the air from the starch, pouring the starch in a mould independent of the electrophoresis cell, cutting the required size part off the gel block removed from the mould, cutting this part in two, placing the histological sample after freezing and thawing of the sample into a homogenization vessel, wherein a beater is placed, fitting this assembly into a vibrator, followed by the homogenization of the sample, fitting between the gel parts a carrier containing the sample, tightly compressing this medium with the block parts, dipping the gel block thus prepared in a buffer solution vessel containing a first electric contact, fitting a hygroscopic body immersed similarly in a buffer container equipped with a second electric contact, to the other end of the block, and supplying a D.C. potential between contacts.

2. The method of claim 1, characterized by cutting the electrophoretized gel block into slices of a few mm thickness, placing these slices into an incubator solution contained by an incubator vessel made of a material melting at a temperature exceeding 30°C.

3. The method of claim 1, characterized by fitting the incubated and glycerine treated slices onto a glass plate for preservation, and embedding said treated slices in wax or paraffin there.

4. The method of claim 1 wherein said freezing and thawing is done in repeated steps, and said carrier is filter paper, porous glass, or ceramic material.

5. The method of claim 2 wherein said cutting is done with a set of blades matched in a comb-type manner, and said incubator vessel is made of paraffin.

* * * * *